United States Patent
Seyer

(10) Patent No.: US 9,846,876 B2
(45) Date of Patent: Dec. 19, 2017

(54) SYSTEM FOR EXCHANGING A TICKET WITH CHIPS AND VICE VERSA AT A GAMING TABLE IN A CASINO

(71) Applicant: COUNT R GMBH, Kleinmachnow (DE)

(72) Inventor: Rainer Seyer, Berlin (DE)

(73) Assignee: COUNT R GMBH, Kleinmachnow (DE)

( * ) Notice: Subject to any disclaimer, the term of this patent is extended or adjusted under 35 U.S.C. 154(b) by 223 days.

(21) Appl. No.: 14/367,875

(22) PCT Filed: Dec. 18, 2012

(86) PCT No.: PCT/EP2012/075910
§ 371 (c)(1),
(2) Date: Jun. 20, 2014

(87) PCT Pub. No.: WO2013/092559
PCT Pub. Date: Jun. 27, 2013

(65) Prior Publication Data
US 2014/0316980 A1    Oct. 23, 2014

Related U.S. Application Data

(60) Provisional application No. 61/578,356, filed on Dec. 21, 2011.

(30) Foreign Application Priority Data

Dec. 21, 2011 (EP) .................................... 11194928

(51) Int. Cl.
*G06Q 20/38* (2012.01)
*G06Q 50/34* (2012.01)
*G07F 17/32* (2006.01)

(52) U.S. Cl.
CPC ........... *G06Q 20/381* (2013.01); *G06Q 50/34* (2013.01); *G07F 17/3202* (2013.01);
(Continued)

(58) Field of Classification Search
None
See application file for complete search history.

(56) References Cited

U.S. PATENT DOCUMENTS 8,323,102 B2 * 12/2012 Lutnick ................... G07F 17/32
463/29
2006/0246945 A1 * 11/2006 Lee ......................... B60K 35/00
455/557

(Continued)

FOREIGN PATENT DOCUMENTS

CN       101234255 A    8/2008
WO    WO 2006/031918 A2    3/2006
(Continued)

OTHER PUBLICATIONS

Parmley, Suzette. "Casinos Gambling on Coinless Slots Casinos Are Removing the Coins, Putting Sound Effects into Slots." Philly.com. N.p., Apr. 15, 2003. Web. Jul. 26, 2016. <http://articles.philly.com/2003-04-15/news/25474915_1_coinless-slot-machines-casino-player-magazine>.*

(Continued)

*Primary Examiner* — Ryan D Donlon
*Assistant Examiner* — Shacole Tibljas
(74) *Attorney, Agent, or Firm* — Knobbe, Martens Olson & Bear, LLP

(57) ABSTRACT

The invention concerns a system for exchanging a ticket with chips and vice versa, applies a ticket or voucher system to a gaming table in a casino and comprises an accounting system.

11 Claims, 6 Drawing Sheets

Figure 1:
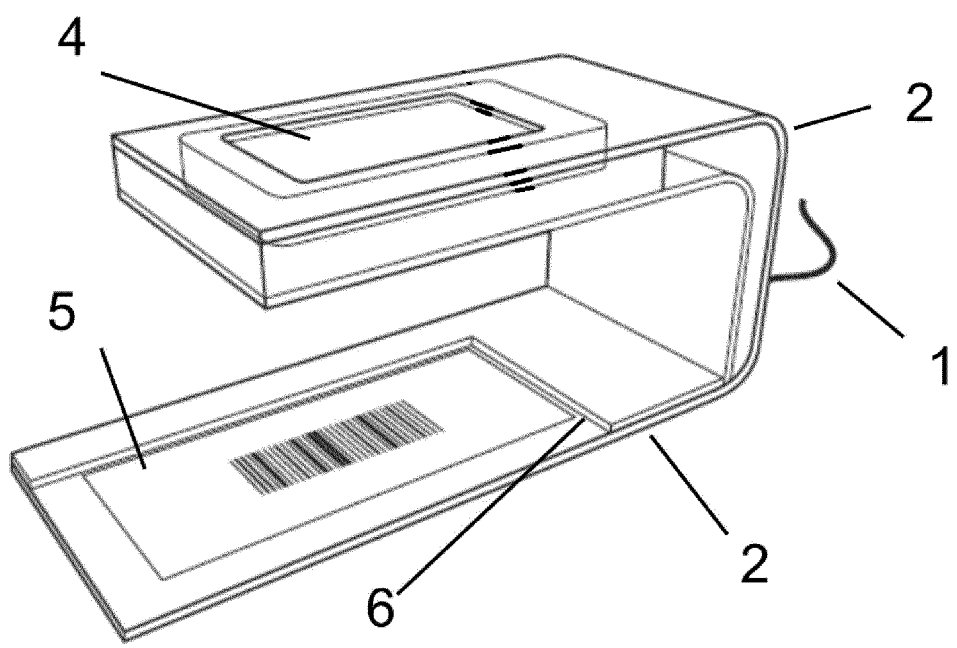

(52) U.S. Cl.
CPC ...... *G07F 17/3204* (2013.01); *G07F 17/3218* (2013.01); *G07F 17/3248* (2013.01)

(56) References Cited

U.S. PATENT DOCUMENTS

| | | | | |
|---|---|---|---|---|
| 2009/0239656 A1* | 9/2009 | Meyerhofer | ........ | G07F 17/3241 463/25 |
| 2011/0263326 A1* | 10/2011 | Gagner | ............... | G07F 17/3211 463/34 |
| 2011/0287819 A1* | 11/2011 | Lee | ..................... | H04M 1/0237 455/575.4 |

FOREIGN PATENT DOCUMENTS

| | | |
|---|---|---|
| WO | WO 2006/131274 A1 | 12/2006 |
| WO | WO 2008/112832 A1 | 9/2008 |
| WO | WO 2008/116151 A1 | 9/2008 |
| WO | WO 2008/144674 A1 | 11/2008 |

OTHER PUBLICATIONS

Franks, Justin. "Meet Justand—IPad Document Camera." YouTube, YouTube, Jun. 18, 2012, www.youtube.com/watch?v=a1OtrS2q18l.*

* cited by examiner

SYSTEM FOR EXCHANGING A TICKET WITH CHIPS AND VICE VERSA AT A GAMING TABLE IN A CASINO

The invention concerns a system for exchanging a ticket with chips and vice versa, applies a ticket or voucher system to a gaming table in a casino and comprises an accounting system.

BACKGROUND OF THE INVENTION

In casinos, large amounts of money are exchanged and placed at risk and it has always been a significant concern of the casino industry to protect the casinos and players against fraudulent events. In casino table games, there are generally three areas of risk in fraud, 1) falsifying/replacing playing cards, 2) falsifying/replacing chips, and 3) passing of information improperly. Casinos would also classify certain forms of play at table games as at least undesirable, if not excludable (such as card-counting).

Gaming devices have been known which dispense winning awards in various forms. For example, it has been known to dispense winning prizes if a randomly determined outcome is one of a preselected plurality of winning outcomes from a greater plurality of possible outcomes. Such awards have been provided to players in the form of coins, currency, credits or tickets redeemable for prizes. For example, U.S. Pat. No. 5,397,125 describes, that winning players are provided with the opportunity of receiving payouts in at least two distinct forms, both of which are inherently valuable. For example, according to one embodiment, a first payout comprises a national currency while another form of payout comprises tokens formed of a precious metal such as silver or gold. It has also been previously disclosed to dispense winning payouts consisting of either checks in a form redeemable at a bank or other "redeemable tickets", i.e. tickets which are redeemable for prizes at a gaming establishment.

Gaming machine manufacturers have introduced cashless enabled games such as a slot machine to the market and these have begun to find wide acceptance in the gaming industry. The slot machine is an electro-mechanical game wherein chance or the skill of a player determines the outcome of the game. Slot machines are usually found in casinos.

Today, players in a casino play games on tables with dealers (e.g. Black Jack, Roulette), where chips are used as money. Usually, the player approaches the dealer and buys chips for cash, i.e. handing over a bank note to the dealer and receiving chips in exchange.

When the player finished playing, he will have to take all the chips off the table and will have to take them to the next table to play or carry them to a cashier's cage of the main bank of the casino to change them for cash.

Cashless enabled games are so named, because they can conduct financial exchanges using a mixture of traditional currencies and vouchers. Typically, a cashless enabled game has a gaming table device to produce vouchers and a voucher reader that supports automatic reading of vouchers. To coordinate the activities of multiple cashless enabled games, one or more cashless enabled games may be electronically coupled to a cashless enabled game system that controls the cashless operations of a cashless enabled game.

Over the last several years, cashless enabled games have found an increasing acceptance and use in the gaming industry with both the players, who enjoy the speed of play and ease of transporting their winnings around the casino, and the casinos who have realized significant labour savings in the form of reduced coin hopper reloads in the games, and an increase in revenue due to speed of play. Practical field experience with the application has illustrated that there are areas for improvement in current cashless systems.

WO2008/144674 describes a gaming table device which includes a so called TITO (Ticket In Ticket Out) host system for credit transfer comprising a method for exchanging cash against vouchers. However, the method and device therein offers no flexibility regarding issuing individual transaction amounts.

WO2006/031918 describes a validation system having a bulk note feeder assembly. The claimed system comprises a note transportation system and a note validator in order to identify characteristics of each note being passed through the system. Main purpose is bill validation before exchange of cash against chips in a casino.

WO2008/112832 describes a secured gaming table vouchering system to enable the use of game vouchers. The claimed system consists in a single unit which mechanically transports vouchers and/or currency notes after they are introduced into a certain opening of the unit. During mechanical transportation within the unit a bill validation may take place.

SUMMARY OF THE INVENTION

In light of the prior art, the technical problem underlying the present invention is to provide a system to apply a ticket or voucher system to a gaming table in a casino that enables exchanging of a ticket with chips and vice versa and that comprises an accounting system, whereby the system of the present invention does not contain the disadvantages of the prior art.

This problem is solved by the features of the independent claims. Preferred embodiments of the present invention are provided by the dependent claims.

The invention therefore relates to a system for exchanging and for accounting of tickets, comprising a first and a second unit, whereby said first unit comprises
  a. an accommodation for placing at least one ticket in it,
  b. a detection unit for reading the ticket,
  c. a screen for displaying the value of the ticket,
  d. an input unit for subtracting or adding a value to the displayed value of the ticket,
  e. at least one wired and/or wireless connecting means,
and whereby the second unit comprises
  a printer, at least one wired and/or wireless connecting means and a processing unit.

In a preferred embodiment of the system one or more of the attributes selected out of the group detection unit, screen, input unit, connecting means are realized by a mobile device.

In a preferred embodiment the first unit of the system is installed above a table and the second unit is installed below a table.

In a preferred embodiment the first unit comprises a processing unit.

In a preferred embodiment the detection unit comprises a camera or a scanner for photographing or scanning the ticket.

In a preferred embodiment the screen of the first unit for displaying the value of the ticket is a touch screen.

In a preferred embodiment the ticket is a print product or a mobile device.

In a preferred embodiment the displayed value of the ticket is displayed in cash.

In a preferred embodiment after subtracting a value with the input unit from the value of the ticket, the subtracted value is handed out as chips. Technically it is preferred, that in particular the whole ticket is redeemed, for example a part of the value of the ticket is handed out as cash and a new ticket with the remaining value is printed.

In a preferred embodiment after adding a value with the input unit to the value of the ticket, a ticket with the new value is printed.

In a preferred embodiment a ticket is printed by the second unit.

In a preferred embodiment the connection between the first and second unit is established by wired or wireless connection.

In a preferred embodiment the first and/or second unit is connected to a central server.

In a preferred embodiment the first and/or second unit is verifying the ticket by sending information about the ticket to the central server.

In a preferred embodiment the first unit comprises a mounting device for at least the mobile device, preferably a smartphone.

In a preferred embodiment the printer is connected to the mobile device by wireless or wired connecting means.

DETAILED DESCRIPTION OF THE INVENTION

In a first aspect, the invention relates to a system for exchanging and for accounting of tickets, comprising a first and a second unit, whereby said first unit comprises
  a. an accommodation for placing at least one ticket in it,
  b. a detection unit for reading the ticket,
  c. a screen for displaying the value of the ticket,
  d. an input unit for subtracting or adding a value to the displayed value of the ticket,
  e. at least one wired and/or wireless connecting means,
and whereby the second unit comprises
  a printer, at least one wired and/or wireless connecting means and a processing unit.

It is preferred that the invention relates to a method for exchanging a ticket for chips, comprising:
  a. placing a ticket under a first unit,
  b. photographing or scanning the ticket with the first unit,
  c. displaying the value of the ticket on a screen of the first unit, wherein the value is displayed in cash and
  d. subtracting or adding a value to the displayed value by usage of an input device on the first unit, whereas the subtracted value is handed out as chips and optionally
  e. printing a new or amended ticket by a second unit.

It was very surprising, that the invention solves the underlying technical problem by a quick and easy method, wherein the system of a voucher is brought to the table game. The player can come with a ticket (analogous for voucher) to the gaming or game table, hands it to the dealer working at the table and gets chips in exchange. No need further exists to carry around large amounts of chips or to hand large amounts of chips to the dealer. The method improves the exchange of a ticket for chips and makes it secure.

A person entering a casino can buy a ticket at appropriate ticket machines or at the cashier. The ticket can then be used at slot machines or gaming tables. When the person (i.e. the player) wants to play at a gaming table, he hands over the ticket to the dealer at the table. The dealer places the ticket under the detection unit of the first unit, which is preferably mounted to the table by e.g. a device and comprises an accommodation for at least one ticket. Reading the ticket happens very quickly, as either the ticket is marked with an authentication code or with a code representing the value of the ticket. Both codes can be a barcode, a QR-code or any other code for storing information. The code is preferably printed on the ticket. The authentication code allows for unambiguous identification of the player or the ticket respectively. In addition to the code the value of the ticket may be printed on the ticket, for example a corresponding cash amount the tickets values stands for. Preferably the code and not the printed value of the ticket is recognized and read by the detection unit of the present invention.

In the sense of the invention, a ticket can be a print product but also a digital device that is used as a ticket. Such a digital device may be a mobile phone, on which an application is installed. The application can preferably be used as a voucher or ticket in the casino. In that way for example on the display of the digital device all necessary information including the code is displayed and readable by the detection unit of the first unit. The displayed information allows for example conducting the method for exchanging a ticket with chips or vice versa.

The first unit preferably comprises an accommodation, a processing unit, a screen, wired and/or wireless connecting means, a camera, a barcode scanner and/or an input unit. The first unit photographs the ticket with a camera or scans the ticket with the camera or a scanning unit. The detection unit can be a device that is part of the first unit or attached to it, able to read a code on a printed medium. Reading comprises photographing or scanning. Surprisingly, photographing is possible to recognize and read the necessary ticket information.

It is preferred that photographing is contactless whereby no movement of any component of the first unit is required to read the code with the dedicated ticket information, preferably the ticket value. Furthermore, it was surprising that with the first unit of the present invention also the ticket does need to be moved or transported by or within the first unit for reading the information of the ticket, in particular the ticket value. Avoiding any transportation of the ticket or any movement of any part of the first unit for recognizing the ticket information is a huge advantage for achieving quick, reproducible and fail-save results in reading the ticket information.

In a preferred embodiment of the present invention for example a scanner is used to recognize the ticket information, in particular the ticket value. Scanner comprises a device that optically scans images, printed text, handwriting, or an object, and converts it to a digital image. It is preferred that the scanned code or pictured ticket is processed by software in the first unit and/or the second unit, preferably in the processing unit. In the sense of the invention, the software can also be described as app or application installed on the first and/or the second unit.

It is further preferred that the screen of the first unit is a touch screen. In the context of the present invention, a touch screen is an electronic visual display that can detect the presence and/or location of a touch by a human finger and/or a stylus. A touch screen is a generally two-dimensional sensing structure which can detect where it is touched. These touch screens are common in (but not limited to) smart phones, mobile phones, displays, tablet-PCs, tablet notebooks, graphic tablets, television devices, trackpads, touchpads, input devices, PDAs, and/or MP3 devices. Technologies to perform this detection include resistive, capacitive, acoustic and optical technologies.

The first unit can be any device having a processing unit, a screen, wired and/or wireless connecting means, a camera, a barcode scanner and/or an input device, such as a smart phone, mobile phone, tablet or PDA. In a preferred embodiment the system according to the present invention in particular the first unit for example comprises the items detection unit, screen, input unit and/or connecting means which are realized by a smartphone. Preferably the first unit comprises a mounting device for at least the smartphone. The smartphone in particular comprises a camera, a touch screen, wired and/or wireless connecting means, a flash light, LEDs and/or a processing unit.

A mobile device according to the present invention preferably comprises a smart phone, mobile phone, tablet, PDA (personal digital assistant), touch pad, feature phone, cell phone, portable media player, tablet computer. The mobile devices according to the present invention preferably comprise Wi-Fi and/or mobile broadband access. The mobile operating systems (OS) used by the mobile device includes for example Google's Android, Apple's iOS, Nokia's Symbian, RIM's BlackBerry OS, Samsung's Bada, Microsoft's Windows Phone, Hewlett-Packard's webOS, and embedded Linux distributions such as Maemo and MeeGo. Such operating systems can be installed on many different mobile phone models, and typically each device can receive multiple OS software updates over its lifetime. The mobile device can comprise any software or program for illustration or displaying the ticket information for example Java.

A smartphone is for example a mobile phone built on a mobile operating system with more advanced computing capability and connectivity than a feature phone. A feature phone is for example a mobile phone which in particular has additional functions over and above standard mobile services. It is preferred, that the smartphone can be detached and attached to the first unit and can especially be used as a mobile device. Therefore, the dealer can detach the smartphone from the unit and use it as a mobile device. In general, the system is mobile and can be attached to another table. This is very advantageous over the state of the art. It was surprising, that any mobile device can be used for the system, preferably smartphones, cell phones, tablet-PCs, tablet-notebooks or PDAs. However, the devices have preferably a camera, a touch screen, wired and/or wireless connecting means, a flash light, LEDs and/or a processing unit.

In the context of the invention, a wired connecting mean is for example a LAN or cable connection to the central server. It is also preferred that the first unit is connected to the second unit via a wired or wireless connection. The preferred wireless connection is Bluetooth, Wi-Fi or any other wireless connection, suitable for connecting the first unit to the second unit and/or the first unit to the central server. The connecting means further comprise cables, connectors and communications protocols used in a bus for connection (e.g. USB hub or converters). It can for example be used to standardize the connection of the first unit with the second unit or the connections between the units and further electronic devices.

It is preferred that the first unit and the second unit are connected via a wired connection using an USB port as connection interface. The first unit and/or the second unit are connected with an electric power supply. The system of the present invention preferably is suitable to run without interruption 24 hours a day. It is further preferred, that the first unit and/or the second unit are comprising a battery, preferably a rechargeable battery. The battery fulfils the needs of an uninterrupted power supply unit (UPS) in order to ensure the continuous use without any shut down or restart of the system in case for example the connection to the power supply is interrupted. In particular due to the rechargeable battery the first unit of the inventive system can work independent from external power supply. In case any machine care in the second unit has to be conducted or for example any refill with blank tickets to the storage container in the second unit is needed, not the whole system needs to be stopped. This is a huge advantage to ensure quick maintenance periods. The UPS ensures a continuous power supply to keep the system productive. It is preferred that the system offers the flexibility that the first unit can be connected with any other second unit in a casino which is in particular suitable to print tickets. In that regard a wireless connection is preferred, but also a wired connect is possible to connect the first unit to any other second unit comprised by the present invention. Preferably, the first unit of the system is installed above a table (above-table-unit) and the second unit is installed below a table (below-table-unit).

After the code of the ticket is read by the first unit and processed by the processing unit, the value of the ticket is displayed on the screen, preferably in cash. The processing unit is also designated as computing unit, which is preferably at least one processor. To verify the validation of the ticket, the first unit is connected to a central server, storing information about issued tickets and their value. The processing unit which is for example either placed in the first unit or in the second unit is verifying the ticket by sending information about the ticket to the central server, which sends a positive or negative feedback back to the processing unit which is part of the first unit or the second unit. In this way the system of the present invention is suitable to identify the validity of the tickets. Furthermore, with the present invention it is possible to invalidate tickets or the change the value of a ticket by printing a new ticket after entering the dedicated information into the system. The new value of the ticket can be entered with the input unit being preferably a part of the first unit.

The ticket owner (also described as player) can determine how many chips he wants to redeem. The preferred amount is for example subtracted from the total value of the ticket, whereby technically it is preferred that in particular the whole ticket is redeemed, for example a part of the value of the ticket is handed out as cash and a new ticket with the remaining value is printed. The dealer can determine the redeemed value or can subtract a value from the displayed value by usage of the input unit of the first unit, whereas the determined or subtracted value is handed out as chips and for the remaining value in particular a new ticket can be printed. The input unit can be attached to the first unit or can be a part of it. It is preferred that the input unit is the touch screen, which can be touched by the dealer. However, it is also preferred that a keyboard is connected to the first unit, which can be used as input unit. Furthermore, the first unit can be a tablet PC or tablet having a touch screen.

It is also preferred that the player hands the ticket to the dealer who reads the ticket, by placing it under the detection unit of the first unit. The value of the ticket is shown on the screen, preferably the touch screen. The player determines how many chips he wants to redeem and the dealer places the redeemed ticket into a container, for example a drop box beside the gaming table.

After having subtracted the value that is demanded by the player from the total value of the ticket, the dealer hands the difference as chips to the player. The new or amended value of the ticket is saved by preferably sending the information (i.e. the new value of the ticket) from the first unit or the second unit to the central server. It is also preferred that the first unit sends the information wired or wireless to the second unit and the second unit is connected to the server and sends the information wired or wireless to the server.

If the player has played a game at the table and has won chips, it is preferred that the value of the chips can be added to the ticket of the player by handing the chips to the dealer, who counts the chips and adds the amount in cash to the ticket. Therefore, he preferably photographs the ticket, wherein the amount value of the ticket is shown on the touch screen. The dealer then enters the won amount in cash, which is then automatically added to the value of the ticket. The total amount is send from the processing unit of the first unit or second unit to the central server.

It is also preferred, that when a player wants to leave the table the dealer can take all the chips and issues a ticket for the value of the chips. The dealer counts the chips, enters the value into the first unit and prints out a new ticket which is handed to the player. The print out is preferably produced by the second unit, which comprises a printer, preferably a thermo printer and wired and/or wireless connecting means for connecting the second unit with the first unit. Furthermore, the second unit comprises a processing unit for processing the information recognized by the detection unit preferably being a part of the first unit. It is preferred that the system according to the present invention preferably can be used as accounting system in the sense that the won amount or value of chips can be entered with the input unit into the system. With printing a new ticket, for example the total won amount can be booked with the system of the invention to the ticket of the player. In this case the ticket for example acts as individual account of the player. The player can take the ticket with him from the table (no chips); and can either use it to play at another table, a slot machine or can redeem the ticket for cash on a self service redemption terminal or the cashier's cage.

Preferably the system according to the present invention concerns a device comprising a smartphone, connecting means, a printer and a mounting device for conducting a method as described above. The smartphone of the device is preferably attached to an object, such as a gaming table or any other table by the mounting device. The mounting device therefore comprises means for accommodating the smartphone, such as an inclusion having means for holding the smartphone in place. The mounting device preferably comprises at least one accommodation for placing the ticket in it. The mounting device is in particular tiltable. With that, the mounting device which preferably is a suitable housing for the smartphone can be brought into the position necessary for the dealer to see the information displayed on the screen. Due to the tiltable construction of the mounting device of the first unit the screen of for example the smartphone can be pivoted to enable the player seeing the screen. With that the player can verify for example the new amount the dealer is entering into the system before printing the new ticket.

The mounting device has preferably an accommodation for at least one ticket. The accommodation is oriented in such a way, that if the ticket is placed in it, the ticket is in close proximity to the camera or scanner of the smartphone. After scanning or photographing the ticket, the value of the ticket is displayed on the screen, preferably the touch screen of the smartphone. When the dealer wants to print out a new ticket for a player, if for example the player is leaving the table, the dealer can print out the ticket at the printer, which is connected to the smartphone by wireless or wired connecting means. The device is preferably been used for exchanging a ticket for chips or vice versa.

The invention has several advantages over the prior art, such as:

If a player wants to move from table games to slot machine games or vice versa he has to go to a cashier and either exchange his chips or his ticket into cash. The cash he got at the manual or automated cashier he could then take to the new games and start playing. There is always a big probability that the player is leaving the casino after changing his winnings into cash and even if the player stays inside the casino he has to go to a cashier and queue up which can take in peak times easily half an hour. This time is time the player can play slot machines or table games if the preferred method or device is used.

Issuing or redeeming tickets at the table takes work load from the cashiers and reducing queues in peak times.

Currently there is a constant flow of chips from the table games to the cashiers done by players. On the other hand the casino returns the chips from the cashiers back to the table games. By using the system of the present invention, the chips will stay at the table, without the need for the casino administration to return the chips from the cashiers to the table games. This is saving logistic efforts for the casino.

Using mobile devices in the sense of the present invention was very surprising. It was not obvious that the mobile device can be integrated in a complex system, for example in a casino, serving the accounting as well as the ticket exchange against chips and vice versa at a gaming table.

The use of a mobile device comprising in particular a rechargeable battery offers huge advantages in acting in the sense of the present invention as uninterrupted power supply unit to enable continuous fail-save operation of the inventive system.

With the system of the present invention, preferably comprising a touch screen, a camera, a processing unit and a for example wireless connection as part of a mobile device together with a printer, processes in a casino are made in particular economically more efficient in a structured, flexible, quick and standardized way by the invention.

In a preferred embodiment, the system comprises the following functional components: barcode scanner, touch screen display, ticket printer, computing unit, power supply, USB Hub, USB-LAN converter, mounting device or chassis to hold barcode scanner and touch screen and/or separate chassis for ticket printer and peripherals.

The bar code scanner, light touch screen display and computing unit can preferably be realized by using a smart phones or tablet PCs camera, flash light, LED, touch screen and microprocessor. These units will be integrated into a unit which is preferably located on the table of the table game.

The first unit on the gaming table is preferably connected to a second unit with the ticket printer and all peripherals are preferably located under the table accessible to the dealer.

The first unit or the second unit is preferably connected to the casino online system of the casino via wired or wireless connection, such as LAN or WLAN. The system is preferably interfacing to software and transmitting the transaction back to the software. The casino can use software to produce a report for each table on redeemed and printed tickets.

EXAMPLES

The invention is described by the following examples. The examples provided herein represent practical support for particular embodiments of the invention. These are not intended to limit the scope of the invention. The examples are to be considered as providing a description of possible and potentially preferred embodiments that demonstrate the relevant technical working of one or more non-limiting embodiments.

Example 1

The player will hand a ticket to the dealer who will place it the opening of the first unit preferably under the camera of the smartphone which comprises a flash light or LED. The screen, preferably a touch screen will indicate after verification and information exchange with the central server whether the ticket is valid or not.

Acceptance of a Valid Ticket:

If the ticket is valid, the screen will show the amount of the ticket on the screen. The dealer can confirm this with the player and then pays out the amount shown on the screen in chips less the amount that is below the pay-out threshold, for example $20.

For tickets with amounts below the pre-set threshold, the system will automatically print a change ticket for this amount. For example:

Ticket value as displayed on the screen $225.50
Threshold is set at $20.00
System will print ticket for: $5.50

The dealer will pay out chips to the value of $220 and hands over the new ticket to the player. The old ticket (already fully redeemed) is placed in the drop box by the dealer. If this ticket was inadvertently returned to the player, it still has no value.

(Non)-Acceptance of an Invalid Ticket

If the information which is displayed on the screen indicates a ticket is invalid, it must be returned to the player. A ticket will be deemed invalid if the online system came back with a negative response to the validation request of the ticket or if there was a problem with the interface communication. No ticket will be printed.

Acceptance of a Valid Ticket with Partial Payout in Chips

For partial redemption the dealer enters the amount on the keyboard that the player wants redeemed in chips. The display will show this amount to be redeemed after the redemption has taken place.

A ticket will be printed with the remaining balance automatically.

The dealer will pass the chips and ticket to the player and will place the old ticket in the drop box.

Acceptance of Chips and Payout with a Ticket

If the player wants to leave the table he can return the chips to the dealer. The dealer will count the chips and enter the amount into the touch screen of the first unit. The first unit can communicate with the second unit and print a valid ticket with the amount the dealer has entered. This ticket can now be taken to a slot machine for playing or to an automated or manual cashier to receive cash.

Although the invention has been described with respect to specific embodiments and examples, it should be appreciated that other embodiments utilizing the concept of the present invention are possible without departing from the scope of the invention. The present invention is defined by the claimed elements, and any and all modifications, variations, or equivalents that fall within the true spirit and scope of the underlying principles.

FIGURES

Figure 2:
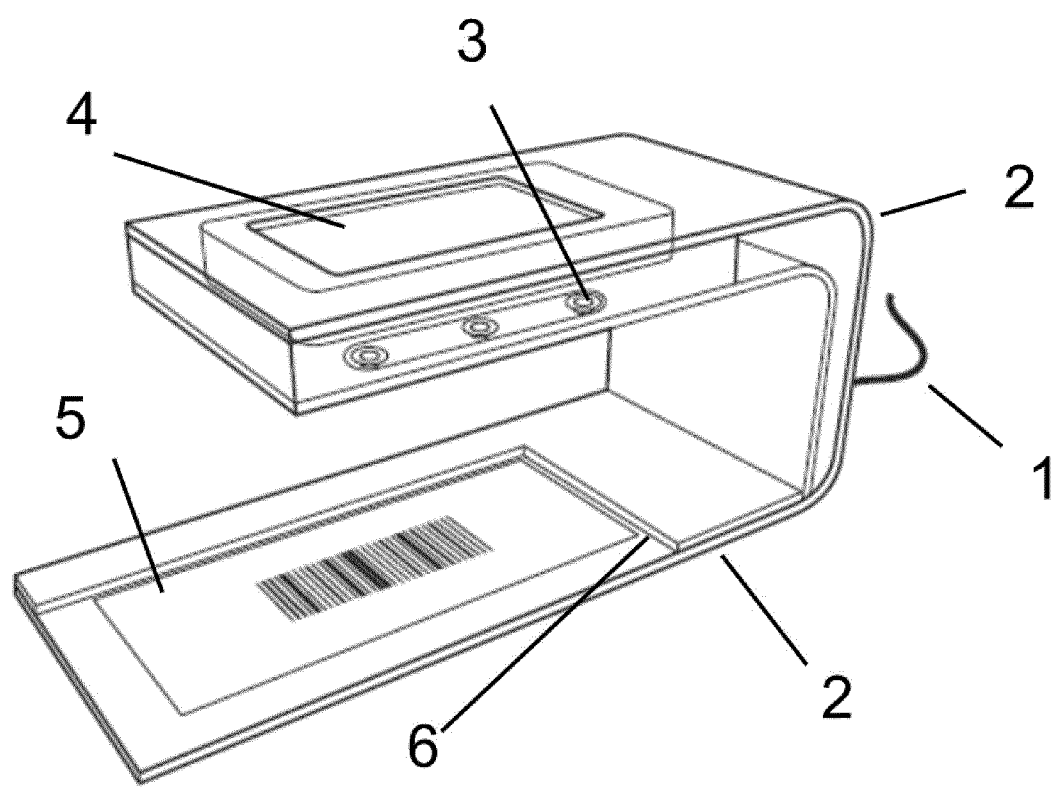
Figure 3:
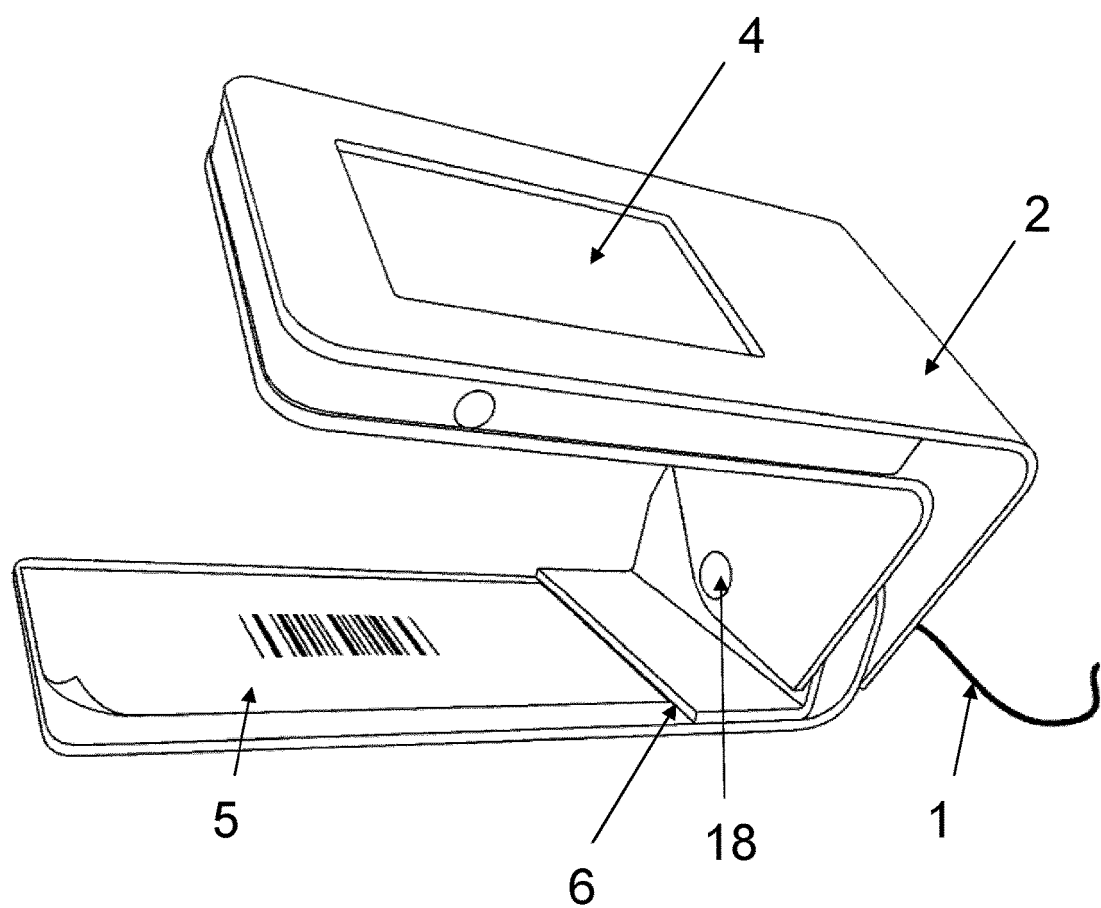
Figure 4:
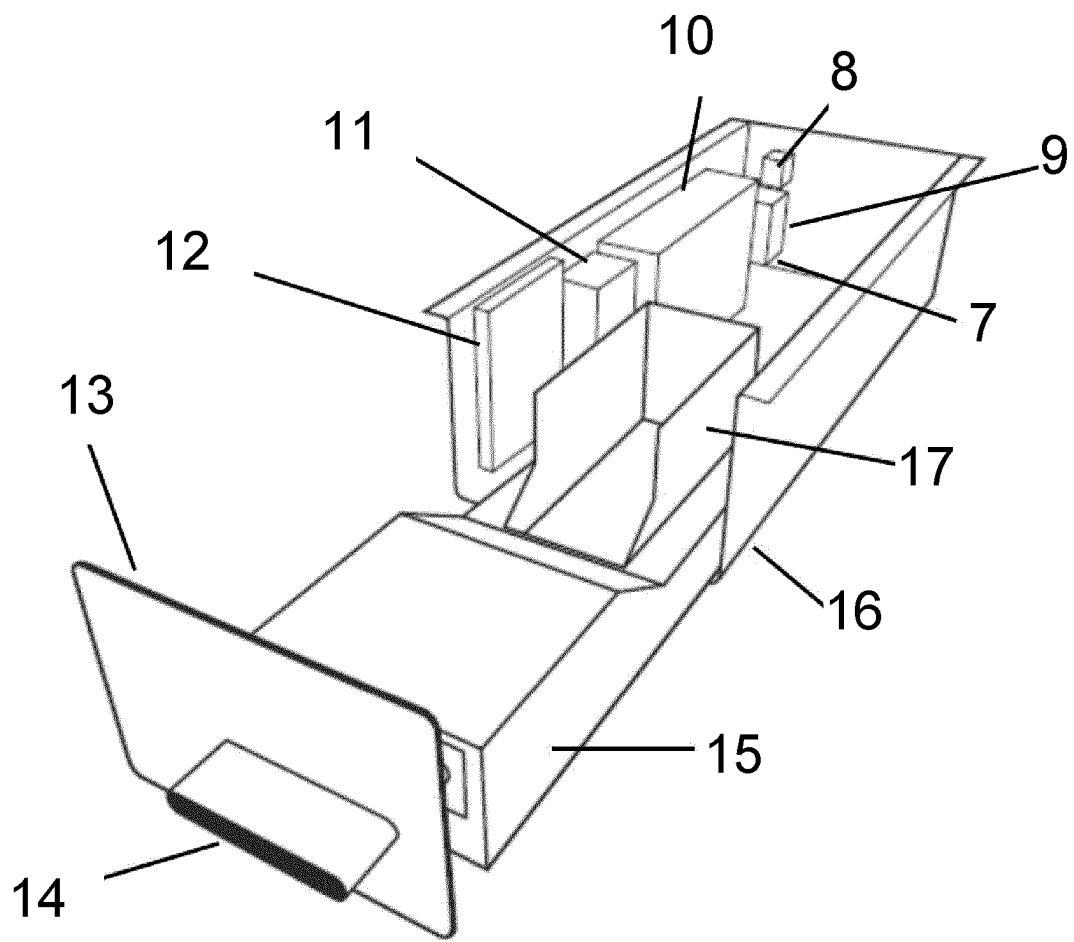
Figure 5:
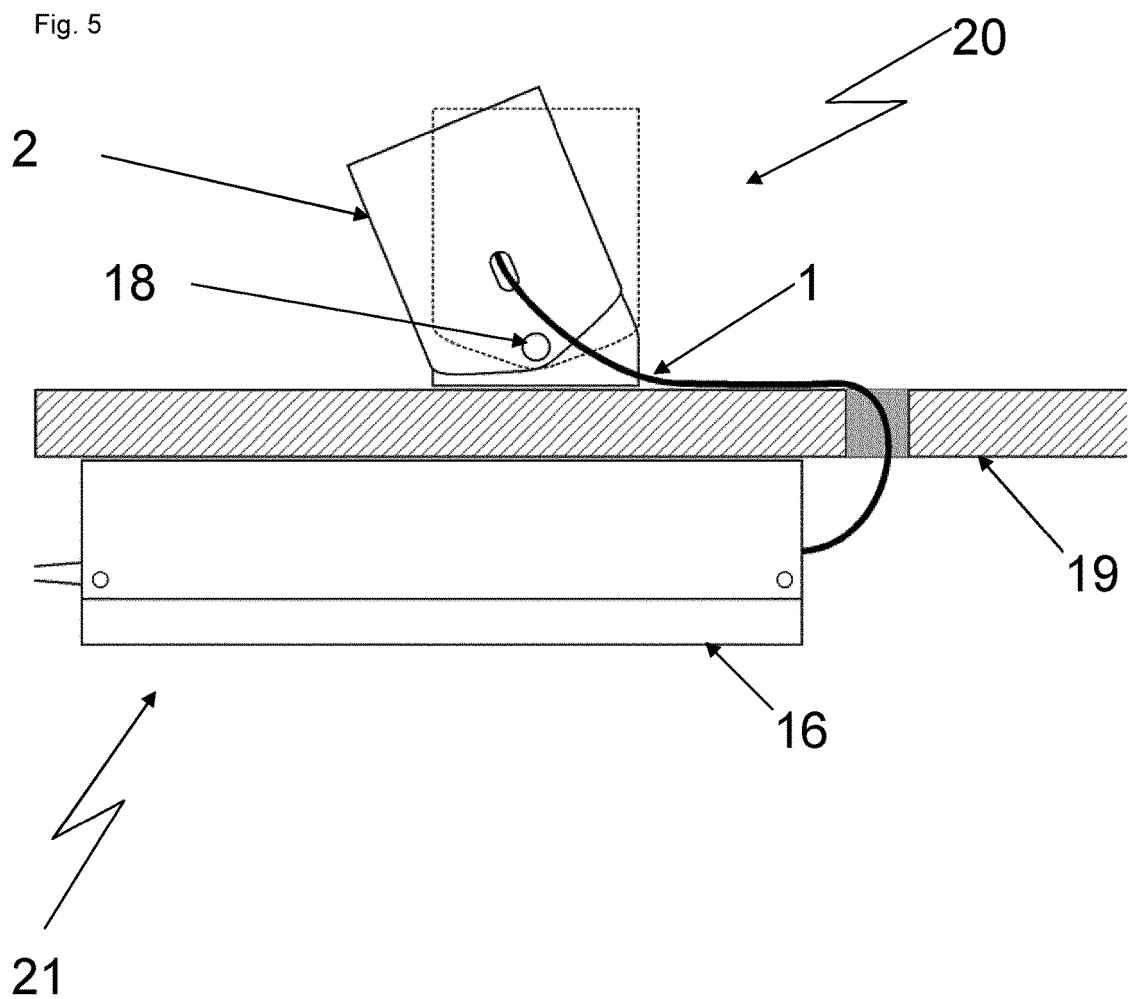
Figure 6:
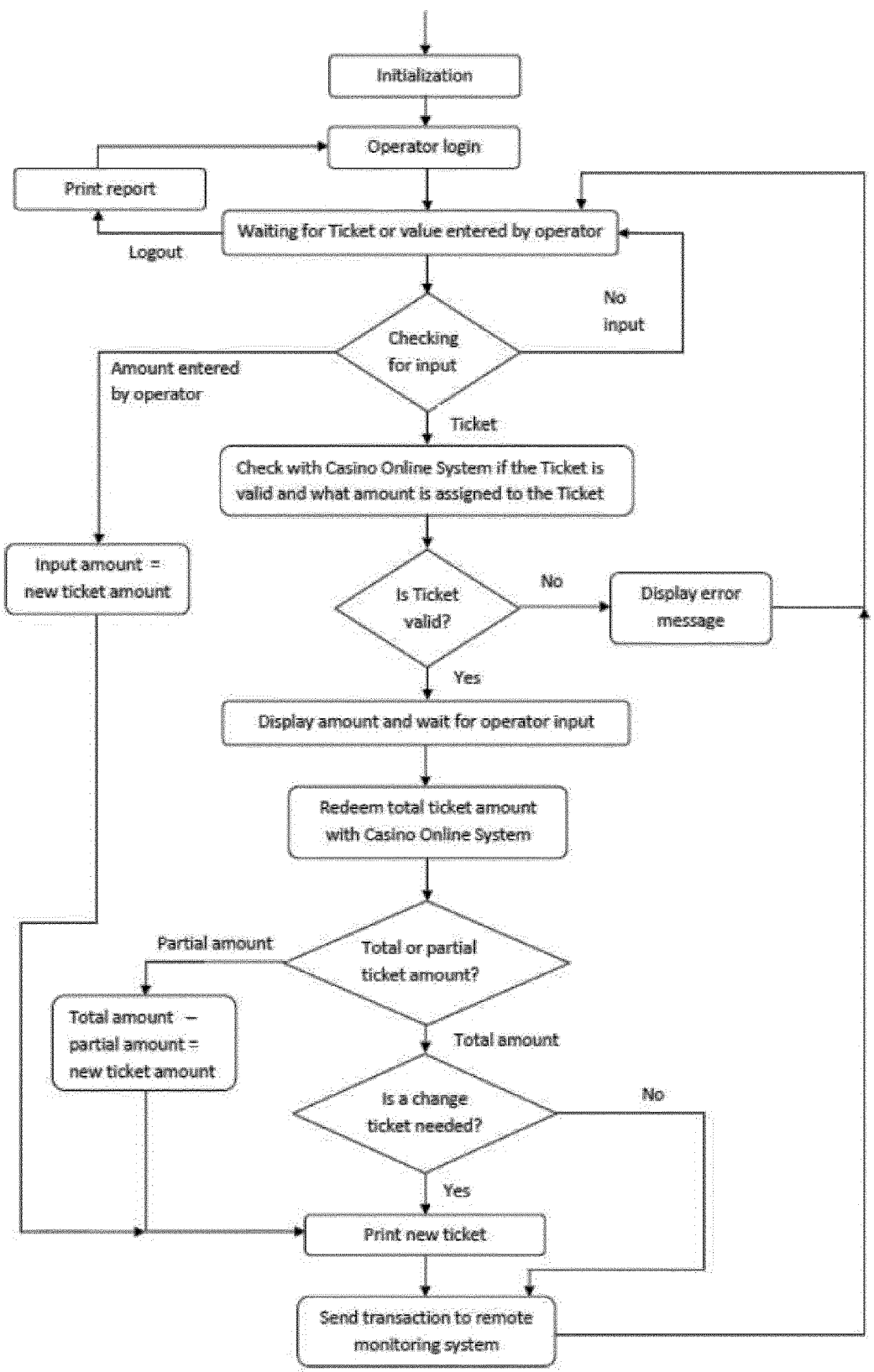

The present invention is described by way of examples in more detail below referring to the following Figures:

FIG. 1 First unit
FIG. 2 First unit with bill verification system
FIG. 3 First unit (tiltable)
FIG. 4 Second unit
FIG. 5 First and second unit (side view)
FIG. 6 Diagram FIG. 1 shows a preferred first unit. The first unit can be accommodated in a metal frame 2 having preferably a u-form. However, the frame 2 can have any form that is suitable for forming an accommodation for a ticket 5, wherein the smartphone 4 is arranged in such a way, that it can scan or photograph the ticket 5. Therefore, it may be preferred that the frame 2 comprises a ticket alignment 6, allowing for optimal alignment of the ticket 5. The alignment 6 can be a mechanical system that allows the aligning of the ticket 5 on the frame 2 in only one orientation, ensuring that the ticket 5 is placed under the smartphone. The frame 2 can further comprise a connection cable to power and printer unit 1 to connect the smartphone 4 to a power supply and to the second unit, preferably the printer. However, it is also preferred that the connection between the first unit, preferably the smartphone 4 and the second unit, preferably the printer is wireless. A preferred wireless connection is for example Bluetooth.

FIG. 2 shows a preferred first unit with bill verification system. The first unit can be accommodated in a metal frame 2 having preferably a u-form. However, the frame 2 can have any form that is suitable for forming an accommodation for a ticket 5, wherein the smartphone 4 is arranged in such a way, that it can scan or photograph the ticket 5. Therefore, it may be preferred that the frame 2 comprises a ticket alignment 6, allowing for optimal alignment of the ticket 5. The alignment 6 can be a mechanical system that allows the aligning of the ticket 5 on the frame 2 in only one orientation, ensuring that the ticket 5 is placed under the smartphone. The frame 2 can further comprise a connection cable to power and printer unit 1 to connect the smartphone 4 to a power supply and to the second unit, preferably the printer. However, it is also preferred that the connection between the first unit, preferably the smartphone 4 and the second unit, preferably the printer is wireless. A preferred wireless connection is for example Bluetooth. In a preferred embodiment, the first unit comprises a bill verification system 3, such as for example a LED and/or UV LED verification system. A player can buy chips at the gaming table, wherein the dealer is verifying the genuineness of the money, especially of bills.

FIG. 3 shows a preferred first unit which is tiltable. The first unit can be accommodated in a metal frame 2. In this metal frame 2 for example a smartphone 4 is arranged in such a way, that it can scan or photograph the ticket 5. Therefore, it may be preferred that the frame 2 comprises a ticket alignment 6, allowing for optimal alignment of the ticket 5. The alignment 6 can be a mechanical system that allows the aligning of the ticket 5. After having scanned or photographed the ticket 5, the value of the ticket 5 is shown on the screen of the mobile device, preferably the smartphone 4. It is preferred that the metal frame 2 of the first unit is tiltable. In order to ensure the tilting the first unit comprises a pivot 18. As means for tilting for example a screw, a suitable hinge or any other suitable means can be used. With tilting the first unit especially the screen of the mobile device, for example a smartphone 4, can be arranged so that the player and/or the dealer can see the screen which shows for example the value of the ticket 5. Furthermore, the first unit comprises preferably a connection cable 1 to power and/or to the second unit comprising a printer. However, it is also preferred that the connection between the first unit, preferably the smartphone 4 and the second unit, comprising preferably the printer is wireless. A preferred wireless connection is for example Bluetooth.

FIG. 4 shows the second unit. The second unit is connected to the first unit and prints out tickets. The first and second unit are preferably separate units. However, it can also be advantageous that both units are combined in only one device or one chassis. Both units can be easily attached to a table. The second unit can be switched on by a main switch 7 and the power supply 10 of the second unit can be easily connected to an external power supply via the power connector 9. However, it can be preferred that either the first and/or second unit are powered by batteries or an accumulator. For connecting the second unit to the first unit and/or the central server, the second unit comprises a network connection 8. To allow several connections of the second unit, the unit can comprise a communication hub 11 and a USB hub 12. Electronic devices can be connected to the second unit, especially the printer via the communication hub 11 or the USB hub 12. To allow easy access to the printer 15 and the storage for paper 17, the front plate 13 of the metal housing 16 accommodating the printer 15, contains a bezel 14.

FIG. 5 shows the side view of the first unit 20, the second unit 21 and a preferred table 19. It is preferred that the first unit is installed above the table 19, in particular a casino table. The first unit comprises a metal frame 2 which is for example tiltable due to a pivot 18. This pivot 18 enables that with tilting the first unit, the screen of preferably a smartphone 4 which is arranged in the metal frame 2 can be observed by the dealer and/or the player. Furthermore, the first unit comprises a connection cable 1 to power and/or to the second unit 21. The second unit 21 is preferably installed below the table 19. The second unit 21 in particular comprises a printer for printing tickets and a metal housing 16.

FIG. 6 shows a diagram about a preferred method. A player enters a casino and buys a ticket for cash. The ticket can be a print product but also a mobile phone, that can be used as a ticket. The mobile phone can also be used to scan or photograph a ticket. For example, a player can use the phone as a ticket to get chips at a gaming table. Therefore, the player hands over the phone displaying a code to the dealer, who scans the code. Essentially, the dealer or operator at a gaming table is handed the phone or a ticket. The ticket or the phone is photographed or scanned by the detection unit of the first unit. It is also possible, that an amount or value of a ticket is typed in manually into the input unit. The operator or dealer can print out with the second unit a ticket over a certain value. If a ticket is scanned or photographed by the first unit, the information will be send either directly or via the second unit to the casino online system (or central server), validating the ticket. Whether the ticket is valid or not is displayed on the first unit, preferably on the mobile device for example the smartphone being installed in a tiltable mounted device of the first unit. If the ticket is valid, the total or partial amount of the ticket can be redeemed for chips. The player can use the chips to play at the gaming table. It can also be preferred that a change ticket is needed. In this case and if the player leaves the table, a new ticket is printed. The player can redeem the new ticket to play at another table or exchange the ticket for cash, preferably at the cashier. The transaction is preferably be sent to the remote monitoring system, that is also designated as the central server or casino online system.

Furthermore, it is also preferred, that the first unit, comprising the mobile device is not mounted to the gaming table. The mobile device can have a wireless connection to the casino online system, e.g. via Wi-Fi. A dealer using the device can scan a ticket, sending the scanned information to the casino central server (also described as the casino online system). If the ticket has been validated by the system, a positive or negative feedback is send back to the device. Depending on the feedback, the dealer is handing over chips to the player. Furthermore, it is also preferred, that the player can redeem his ticket by handing the ticket to the dealer, carrying the mobile device. The dealer (or any other casino worker) validates the ticket and either exchanges the ticket for cash or sends the player to the cashier, if he is not carrying enough money. The information, that the ticket has been redeemed is send back to the casino online system, where the ticket is checked out.

REFERENCES

1 connection cable to power and printer unit
2 metal frame
3 bill verification system
4 smartphone
5 voucher/ticket
6 ticket alignment
7 main switch
8 network connection
9 power connector
10 power supply
11 communication hub
12 USB hub
13 front plate
14 bezel
15 printer
16 metal housing
17 storage for paper
18 pivot
19 table
20 first unit
21 second unit

What is claimed is:

1. A gaming system that comprises a plurality of tables configured to enable subjects to play games, wherein each table comprises a system for exchanging and accounting of tickets comprising:
   i. a first unit comprising:
      a. a receptacle configured to receive a first ticket;
      b. a detector configured to recognize a value of the first ticket, wherein a step of recognizing the value of the first ticket does not require any movement between the first ticket and the detector at the time of recognizing the value of the first ticket;
      c. a screen configured to display the value of the first ticket; and
      d. an input unit configured to accept an input value entered by a user, wherein the input unit is selected from the group consisting of a smart phone, a mobile phone, a tablet, a notebook and a personal digital assistant (PDA); and
   ii. a second unit comprising:
      a printer; and
      a processor; and
   iii. a wired or wireless connection that connects the first and second units, wherein the first unit is installed above each table and the second unit is installed below each table and wherein, the second unit is configured to print a second ticket below the table, wherein the second ticket is printed with a different value than the value of the first ticket, wherein the first unit comprises a tiltable mount configured to accommodate and hold the input unit, wherein the mount has a tiltable construction comprising a u-formed metal frame configured to accommodate the ticket and wherein the metal frame additionally comprises a ticket alignment.

2. The system according to claim 1, wherein one or more of the detector, screen and/or wired or wireless connection comprise a mobile device.

3. The system according to claim 1, wherein the first unit comprises a processor.

4. The system according to claim 1, wherein the detector comprises a camera or a scanner configured to photograph or scan the ticket.

5. The system according to claim 1, wherein the screen of the first unit is configured to display the value of the ticket is a touch screen.

6. The system according to claim 1, wherein the first ticket is a print product or a mobile device.

7. The system according to claim 1, wherein the displayed value of the ticket is displayed in cash.

8. The system according to claim 1, wherein the first and/or second unit is connected to a central server.

9. The system according to claim 1, wherein the first and/or second unit is configured to verify the ticket by sending information about the ticket to the central server.

10. The system according to claim 2, wherein the printer is connected to the mobile device by a wireless or wired connector.

11. The system according to claim 1, wherein the input unit is a smartphone.

* * * * *